United States Patent
Lan (10) Patent No.: US 9,904,328 B1
(45) Date of Patent: Feb. 27, 2018

(54) PROTECTIVE COVER FOR PORTABLE ELECTRONIC DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Chun-Ting Lan, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/379,713

(22) Filed: Dec. 15, 2016

(51) Int. Cl.
  *H05K 5/00* (2006.01)
  *G06F 1/16* (2006.01)
  *H04B 1/3888* (2015.01)

(52) U.S. Cl.
  CPC ......... *G06F 1/1679* (2013.01); *H04B 1/3888* (2013.01)

(58) Field of Classification Search
  CPC ............... H04B 1/3888; G06F 1/1679; A45C 2011/002; A45C 13/002; A45C 2011/003; A45F 2200/0516
  See application file for complete search history.

(56) References Cited

U.S. PATENT DOCUMENTS

| | | | | |
|---|---|---|---|---|
| 5,305,032 | A * | 4/1994 | Arai | G03B 17/08 396/27 |
| 6,665,174 | B1 * | 12/2003 | Derr | G01D 11/24 277/628 |
| D624,909 | S * | 10/2010 | Huskinson | D14/250 |
| 7,930,011 | B2 * | 4/2011 | Shi | H05K 5/0243 206/320 |
| D653,202 | S * | 1/2012 | Hasbrook | D13/103 |
| 8,167,127 | B2 * | 5/2012 | Martin | G11B 31/00 206/320 |
| 8,509,864 | B1 * | 8/2013 | Diebel | G03B 17/02 361/679.32 |
| D727,883 | S * | 4/2015 | Brand | D14/250 |
| 9,166,427 | B2 * | 10/2015 | Panos | H02K 7/1853 |
| 9,241,551 | B2 * | 1/2016 | Lawson | A45C 11/00 |
| 9,319,501 | B2 * | 4/2016 | Huang | H04M 1/0283 |
| 9,549,598 | B2 * | 1/2017 | Rayner | A45C 13/008 |
| 9,729,684 | B2 * | 8/2017 | Chen | H04B 1/3888 |
| 9,748,535 | B2 * | 8/2017 | Huang | H01M 2/1022 |
| 9,755,444 | B2 * | 9/2017 | To | H02J 7/0042 |

(Continued)

*Primary Examiner* — James Wu
*Assistant Examiner* — Hung Dang
(74) *Attorney, Agent, or Firm* — ScienBiziP, P.C.

(57) ABSTRACT

A protective cover in two parts for a portable electronic device includes a first cover, a second cover, and a locking mechanism. The first cover and the second cover form a receiving cavity, to receive a portable electronic device. The locking mechanism includes a movable member, a latch member, and at least one unlocking member. The latch member is engaged with the movable member, each unlocking member is configured for loosening restrictions on movement of the movable member. The movable member can be driven to rotate the latch member relative to the first cover to latch and lock the latch member to the second cover, or to unlatch and unlock the latch member from the second cover.

13 Claims, 8 Drawing Sheets

(56) References Cited

U.S. PATENT DOCUMENTS

| | | | | |
|---|---|---|---|---|
| 2002/0193136 A1* | 12/2002 | Halkosaari | H04M 1/0283 | 455/550.1 |
| 2004/0014506 A1* | 1/2004 | Kemppinen | A45C 11/24 | 455/575.1 |
| 2004/0266498 A1* | 12/2004 | Qin | H04M 1/0283 | 455/575.1 |
| 2005/0141210 A1* | 6/2005 | Liu | E05C 3/004 | 361/801 |
| 2005/0146860 A1* | 7/2005 | Chen | H04M 1/0283 | 361/815 |
| 2005/0180118 A1* | 8/2005 | Lei | H04M 1/0283 | 361/728 |
| 2006/0105722 A1* | 5/2006 | Kumar | G06F 1/1632 | 455/90.3 |
| 2006/0274493 A1* | 12/2006 | Richardson | G06F 1/1626 | 361/679.4 |
| 2008/0316687 A1* | 12/2008 | Richardson | H04B 1/3888 | 361/679.09 |
| 2009/0080153 A1* | 3/2009 | Richardson | H04M 1/18 | 361/679.56 |
| 2009/0186264 A1* | 7/2009 | Huang | H01M 2/1022 | 429/96 |
| 2010/0096284 A1* | 4/2010 | Bau | H04B 1/3888 | 206/320 |
| 2010/0302716 A1* | 12/2010 | Gandhi | G06F 1/1624 | 361/679.01 |
| 2011/0287726 A1* | 11/2011 | Huang | H04B 1/3883 | 455/90.3 |
| 2011/0309728 A1* | 12/2011 | Diebel | H04B 1/3888 | 312/293.1 |
| 2012/0088555 A1* | 4/2012 | Hu | H04B 1/3883 | 455/573 |
| 2012/0088558 A1* | 4/2012 | Song | H04M 1/18 | 455/575.1 |
| 2012/0177967 A1* | 7/2012 | Wang | G06F 1/1632 | 429/100 |
| 2012/0303520 A1* | 11/2012 | Huang | H01M 10/46 | 705/39 |
| 2015/0381226 A1* | 12/2015 | Mogol | H04B 1/3888 | 455/575.1 |
| 2016/0112085 A1* | 4/2016 | Johnson | H04M 1/04 | 455/575.8 |
| 2017/0086551 A1* | 3/2017 | Rayner | A45C 11/00 | |
| 2017/0099922 A1* | 4/2017 | Guerdrum | A45F 5/021 | |
| 2017/0135454 A1* | 5/2017 | Poon | A45C 11/00 | |
| 2017/0173616 A1* | 6/2017 | Rocca | A45C 11/00 | |
| 2017/0183052 A1* | 6/2017 | Whitten | B62J 11/00 | |
| 2017/0194997 A1* | 7/2017 | Tu | H04B 1/3888 | |
| 2017/0201285 A1* | 7/2017 | Liu | H04B 1/3888 | |
| 2017/0246404 A1* | 8/2017 | Graska | A61M 5/3298 | |

* cited by examiner

PROTECTIVE COVER FOR PORTABLE ELECTRONIC DEVICE

FIELD

The subject matter herein generally relates to protective covers, and particularly, to a protective cover for a portable electronic device.

BACKGROUND

A protective cover can receive a portable electronic device, thus providing support and protection to the portable electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented. The term "comprising" when utilized, means "including, but not necessarily limited to"; it specifically indicates open-ended inclusion or membership in the so-described combination, group, series, and the like.

The present disclosure is described in relation to a protective cover configured for receiving a portable electronic device.

Figure 1:
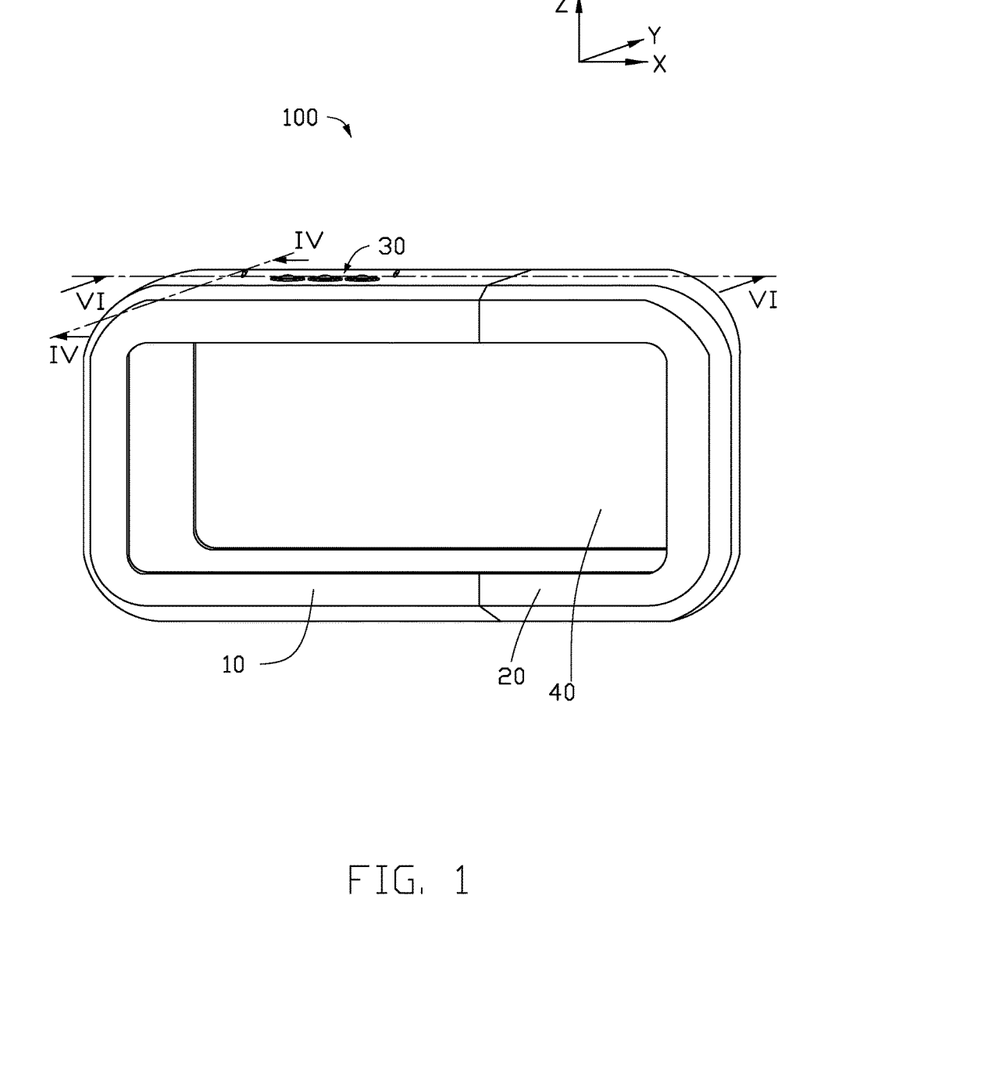
FIG. 1 is an isometric view of an embodiment of a protective cover.

FIG. 1 illustrates a protective cover 100 including a first cover 10, a second cover 20, and a locking mechanism 30. The second cover 20 and the locking mechanism 30 cooperatively define a receiving cavity 40, and a portable electronic device (not shown) can be received in the receiving cavity 40. The locking mechanism 30 can be mounted on the first cover 10, and the first cover 10 can be latched to the second cover 20 by the locking mechanism 30. If an anti-theft device is embedded in the protective cover 100, the portable electronic device can be locked within the receiving cavity 40, to prevent someone from separating the portable electronic device from the protective cover 100.

In one exemplary embodiment, the first cover 10 and the second cover 20 can both be substantially U-shaped. The first cover 10 and the second cover 20 can be installed over the ends of the portable electronic device. The first cover 10 and the second cover 20 can be slid together to form a secure connection, and the first cover 10 and the second cover 20 protect the side walls of the portable electronic device against damage.

Figure 2:
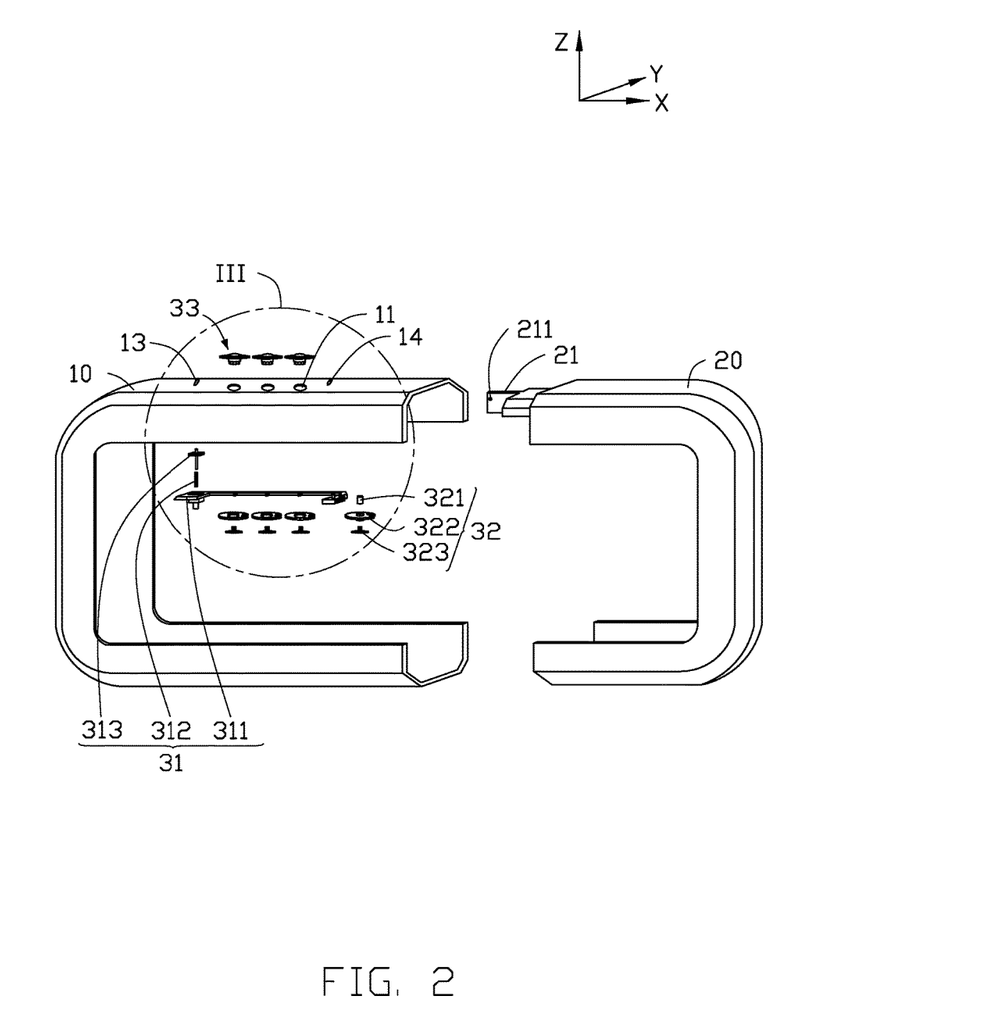
FIG. 2 is an exploded, isometric view of the protective cover shown in FIG. 1.
Figure 3:
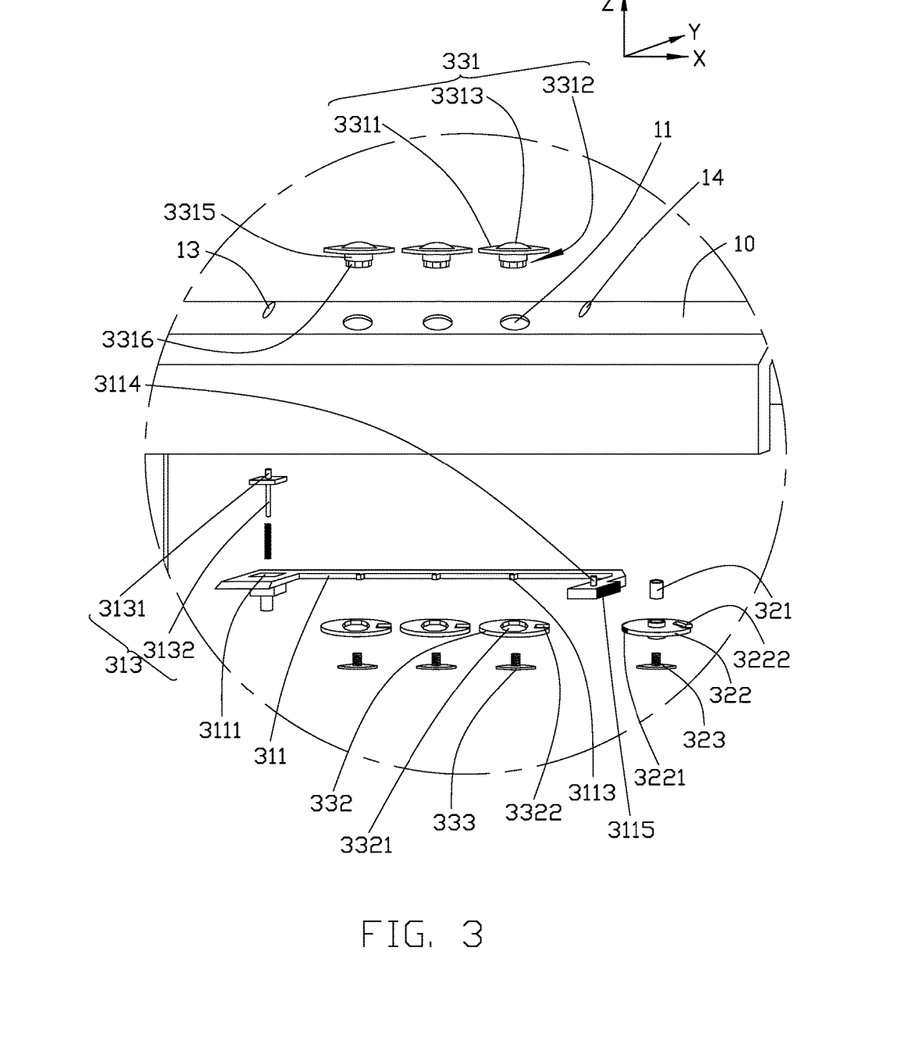
FIG. 3 is an enlarged view of a circled portion III of the cover of FIG. 2.

FIG. 1 through FIG. 3 illustrate that the locking mechanism 30 can include a movable member 31, a latch member 32, and at least one unlocking member 33. The movable member 31 can be movably mounted to an internal surface of the first cover 10. The latch member 32 can be rotatably mounted to the internal surface of the first cover 10, and can be engaged with the movable member 31. The movable member 31 can drive the latch member 32 to rotate relative to the first cover 10 along a first direction, thus the latch member 32 can be latched to the second cover 20. The first cover 10 can define at least one assembly hole 11, and each unlocking member 33 can be assembled to the corresponding assembly hole 11 for releasing the movable member 31 from the first cover 10. The movable member 31 can also drive the latch member 32 to rotate relative to the first cover 10 along a second direction opposite to the first direction, to rotate the latch member 32 away from the second cover 20. In this embodiment, there can be three unlocking members 33. In other embodiments, the number of unlocking members 33 can be one, two, or more than three.

Figure 4:
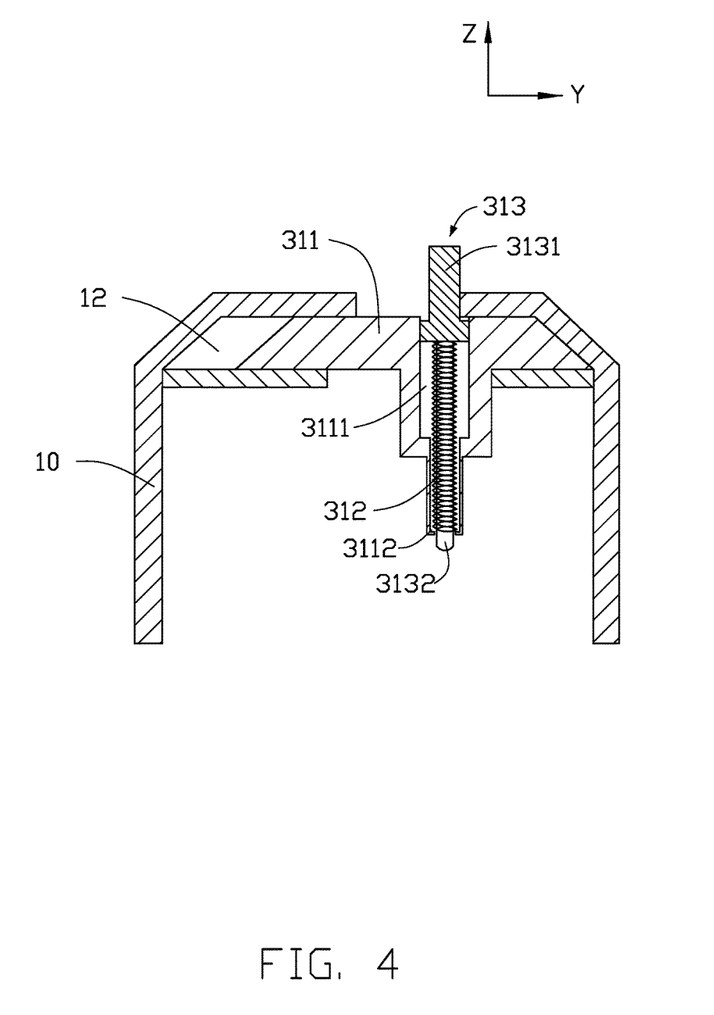
FIG. 4 is a cross-sectional view of the protective cover taken along line IV-IV of FIG. 1, in a first position.
Figure 5:
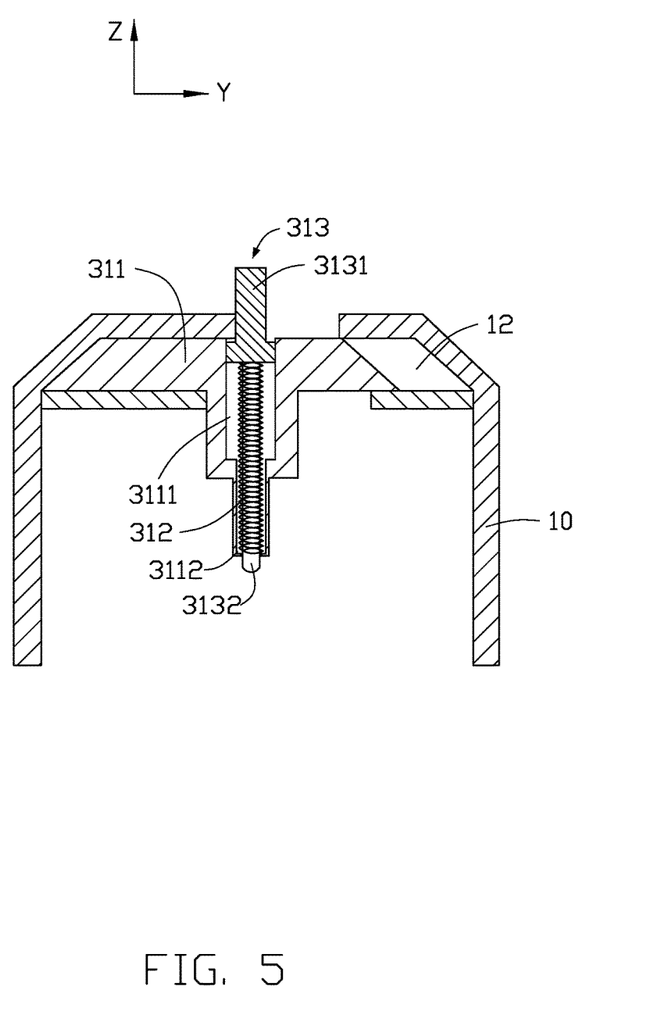
FIG. 5 is a cross-sectional view of the protective cover of FIG. 4 in another position.

FIG. 4 and FIG. 5 illustrate that the first cover 10 can define a sliding cavity 12. The movable member 31 can include a movable plate 311, a spring 312, and a button 313. The movable plate 311 can be movably mounted in the sliding cavity 12. A receiving hole 3111 is defined on one end of the movable plate 311 away from the latch member 32, and the spring 312 and the button 313 can be received in the receiving hole 3111, to perform certain operations on the portable electronic device. The button 313 can include a pressing portion 3131 and a guiding portion 3132. The pressing portion 3131 can be mounted to the guiding portion 3132. The spring 312 can be coiled around the guiding portion 3132, and two ends of the spring 312 abut a bottom surface of the receiving hole 3111 and pressing portion 3131. There is a through hole 3112 defined on the bottom surface of the receiving hole 3111, and the guiding portion 3132 can pass through the through hole 3112 and press against a switch of the portable electronic device.

In FIG. 3, The first cover 10 can define a first slide groove 13 corresponding to the pressing portion 3131. The pressing portion 3131 can pass through the first slide groove 13 and extend away from the first cover 10. The first slide groove 13 can extend along y-axis direction, and the pressing portion 3131 can slide along the first slide groove 13. In other embodiments, the first slide groove 13 can extend along other directions.

The movable plate 311 can define at least one block 3113, and at least one block 3113 can be located on a same side as receiving hole 3111 of the movable plate 311. Each block 3113 can be engaged with an unlocking member 33, and each unlocking member 33 can be configured for loosening restrictions on movement of the movable plate 311.

A pushing rod 3114 can be mounted to the end of the movable plate 311 away from the receiving hole 3111. The first cover 10 can also define a second slide groove 14 corresponding to the pushing rod 3114, and the second slide groove 14 can be parallel to the first slide groove 13. The pushing rod 3114 can pass through the second slide groove 14 and be exposed beyond the first cover 10. The pushing rod 3114 can slide along the second slide groove 14. A first threaded portion 3115 can be formed on the movable plate 311 toward the latch member 32, and the movable plate 311 can be engaged with the latch member 32.

Figure 6:
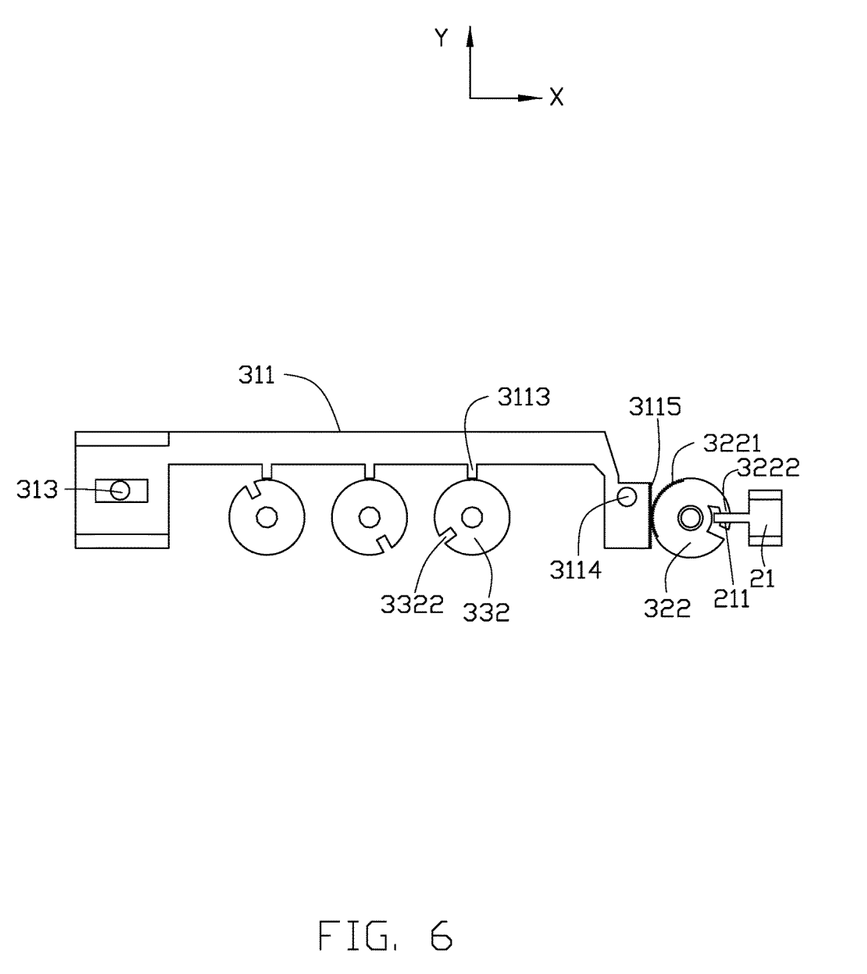
FIG. 6 is a cross-sectional view of the protective cover taken along line VI-VI of FIG. 1, in a first position.
Figure 7:
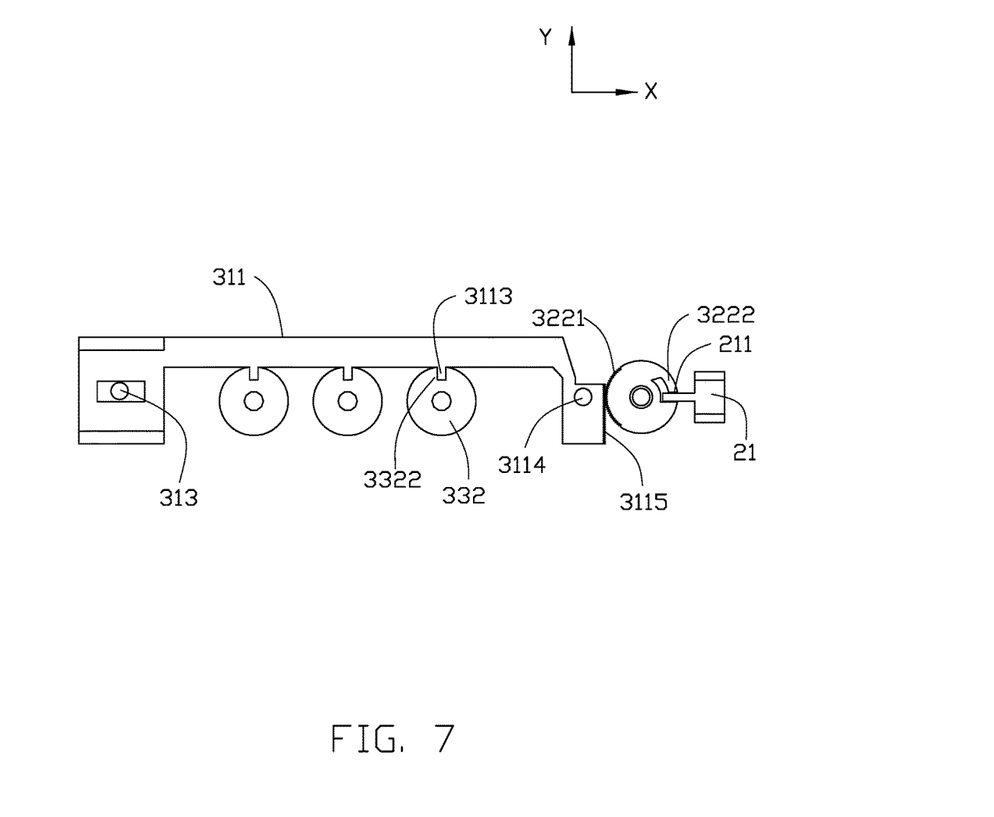
FIG. 7 is a cross-sectional view of the protective cover of FIG. 6 in another position.

As shown in FIG. 3, FIG. 6, and FIG. 7, the latch member 32 can include a main shaft 321, a latching disk 322, and a fastening member 323. The main shaft 321 can be mounted to the internal surface of the first cover 10, and the latching disk 322 can be rotatably coupled to the main shaft 321. The fastening member 323 can be connected with the free end of the main shaft 321, to prevent the latching disk 322 from running off from the main shaft 321. A second threaded portion 3221 can be formed on the latching disk 322 toward the movable plate 311, and the second threaded portion 3221 can be engaged with the first threaded portion 3115. The movable plate 311 can drive the latching disk 322 to rotate around main shaft 321 by the first threaded portion 3115 and the second threaded portion 3221. A protrusion 3222 can be defined to one side of the latching disk 322 away from the movable plate 311. An extending portion 21 can be formed on the second cover 20 extended towards the latching disk 322, and the extending portion 21 can define a locking hole 211 corresponding to the protrusion 3222. The protrusion 3222 can be latched into the locking hole 211, and the protrusion in the exemplary embodiment can be a hook, as the latching disk 322 rotates around the main shaft 321. Thus, the first cover 10 is latched to the second cover 20.

Each unlocking member 33 can include a password wheel 331, an adjusting wheel 332, and a bolt 333 as shown in FIG. 3. The password wheel 331 can be rotatably mounted to the corresponding assembly hole 11, and can include a turntable 3311 and a connecting shaft 3312. The connecting shaft 3312 can be connected to the center of the turntable 3311. A knob 3313 can be formed on one side of the turntable 3311 away from the connecting shaft 3312, and can be configured for rotating the turntable 3311.

Figure 8:
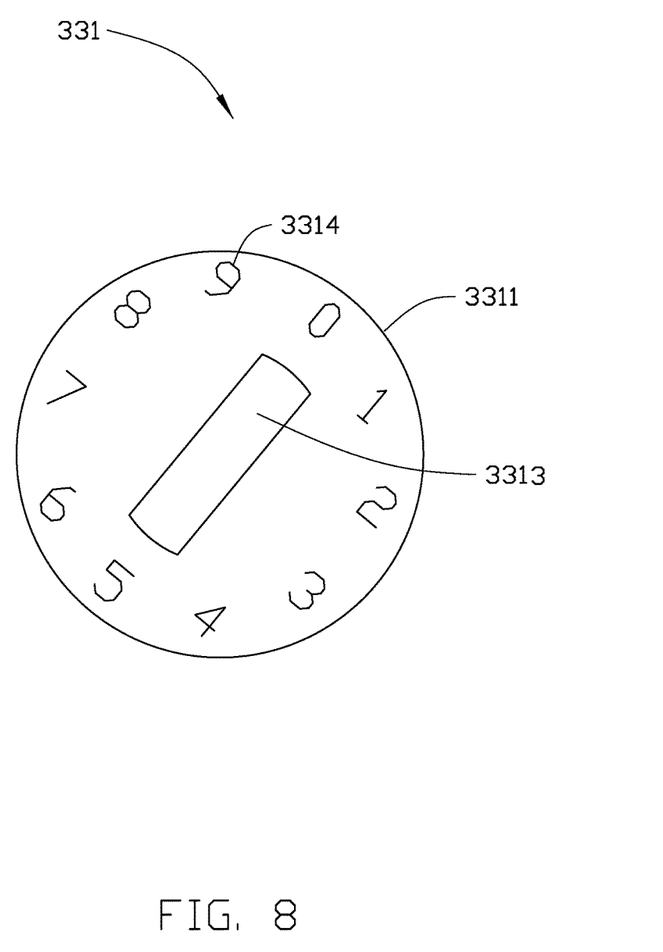
FIG. 8 is a top view of a password wheel of the protective cover shown in FIG. 3.

FIG. 8 illustrates numbers etched on one side of the turntable 3311 away from the connecting shaft 3312. In this embodiment, such numbers are ten basic digits, in order from zero to nine, for generating or decoding a 3-digit password 3314. For example, the 3-digit password 3314 can be "123".

The connecting shaft 3312 can include a rotating portion 3315 and a connecting portion 3316. The rotating portion 3315 can be connected to one side of the turntable 3311 away from the knob 3313, and can be rotatably received in the assembly hole 11. The connecting portion 3316 can be mounted on the one side of the rotating portion 3315 away from the turntable 3311, and can connect with the adjusting wheel 332. In this embodiment, the connecting portion 3316, in the shape of a polygon, can have ten sides, and each side can be positioned to correspond to one of the passwords 3314 generated from ten 1-digit numbers.

The adjusting wheel 332 can be substantially annular, and a connecting hole 3321 can be defined on the center of the adjusting wheel 332. The adjusting wheel 332 can be installed around the connecting portion 3316 through the connecting hole 3321. In the embodiment, the connecting hole 3321 can be coupled with the connecting portion 3316, and connecting portion 3316 can be received in the connecting hole 3321. The adjusting wheel 332 can rotate with the connecting shaft 3312. An opening 3322 can be defined on the edge of the adjusting wheel 332, and the corresponding block 3113 of the movable plate 311 can be received in the opening 3322. The bolt 333 can be connected to one end of the connecting portion 3316 away from the rotating portion 3315, to prevent the adjusting wheel 332 from running off the connecting portion 3316.

An user can reinstall the position of the adjusting wheel 332 relative to the turntable 3311, if the user needs to change the unlock password from "123" to other numbers.

At least one datum line (not shown) can be etched on the first cover 10, and each datum line can correspond to each block 3113 of the movable plate 311. Each number of the unlock password can be aligned with the corresponding block 3113 of the movable plate 311.

In other embodiments, the number of sides of the connecting portion 3316 can be three, four, five or more, and a number of surfaces defining the connecting hole 3321 can be made to match the number of sides of the connecting portion 3316.

In other embodiments, the password wheel 331, the adjusting wheel 332, and the bolt 333 of the unlocking member 33 can be interchangeable with other structural element, as long as the unlocking member 33 can loosen restrictions on movement of the movable member 31.

In other embodiments, an auxiliary mechanism (not shown) can be disposed between the first cover 10 and the second cover 20. For example, the first cover 10 can be removably connected to the second cover 20 by a sliding rail, and the first cover 10 can be latched to the second cover 20 by the locking mechanism 30.

In other embodiments, the latch member 32 can be interchangeable with a rotating rod (not shown), and a center of the rotating rod can be rotatably connected to the first cover 10. The protrusion 3222 can be formed on one end of the rotating rod, and can be engaged with the locking hole 22 of the second cover 20. The movable member 31 can be rotatably connected to the other end of the rotating rod. The protrusion 3222 can be engaged with the locking hole 211 of the second cover 20.

When the protective cover 100 needs to be removed, an user can rotate the password wheel 331, to bring the numbers of the unlock password in line using the datum line. The opening 3322 of each adjusting wheel 332 can correspond to the block 3113. Then, the user can drive the button 313 and the pushing rod 3114 to slide along the first slide groove 13 and the second slide groove 14, and the block 3113 of the movable plate 311 can be received in the opening 3322 of the adjusting wheel 332. The movable plate 311 can drive the latching disk 322 to rotate by the first threaded portion 3115 and the second threaded portion 3221. The protrusion 3222 of the latching disk 322 can be rotated away from the locking hole 211 of the second cover 20, thereby the portable electronic device can be disengaged from the protective cover 100.

When the portable electronic device needs to be turned off, an user can rotate the password wheel 331, to input the unlock password. Then, the user can drive the button 313 and the pushing rod 3114 to slide along the first slide groove 13 and the second slide groove 14, to align the button 313 to the switch of the portable electronic device. The user can then turn off the portable electronic device by pressing the button 313.

As the portable electronic device is covered by the first cover 10 and the second cover 20, it can protect the portable electronic device from being damaged. As the first cover 10 is latched to the second cover 20 by the locking mechanism 30, theft of the portable electronic device may be prevented. Furthermore, the protective cover 100 can improve operational security of the portable electronic device.

The embodiments shown and described above are only examples. Many details are often found in the art such as the other features of a protective cover. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A protective cover configured for receiving a portable electronic device, the protective cover comprising:
    a first cover defining at least one assembly hole;
    a second cover engaged with the first cover, wherein the first cover and the second cover form a receiving cavity to receive a portable electronic device; and
    a locking mechanism comprising a movable member movably mounted to an internal surface of the first cover, a latch member rotatably mounted to the internal surface of the first cover, and at least one unlocking member;
    wherein the latch member is engaged with the movable member, each unlocking member is assembled to the corresponding assembly hole and configured for loosening restrictions on movement of the movable member, the movable member is driven to rotate the latch member relative to the first cover to latch and lock the latch member to the second cover, or to unlatch and unlock the latch member with the second cover;
    wherein the first cover defines a sliding cavity, the movable member comprises a movable plate, a spring, and a button; the movable plate is movably mounted in the sliding cavity, a receiving hole is defined on one end of the movable plate away from the latch member, and the spring and the button are received in the receiving hole.

2. The protective cover of claim 1, wherein the button comprises a pressing portion and a guiding portion, the pressing portion is mounted to the guiding portion, the spring is coiled around the guiding portion and coupled between a bottom surface of the receiving hole and pressing portion, a through hole is defined on the bottom surface of the receiving hole, and the guiding portion passes through the through hole to press against a switch of the portable electronic device.

3. The protective cover of claim 2, wherein the first cover defines a first slide groove corresponding to the pressing portion, the pressing portion passes through the first slide groove and extends away from the first cover, and the pressing portion slides along the first slide groove.

4. The protective cover of claim 3, wherein the protective cover further comprises a pushing rod mounted to the end of the movable plate away from the receiving hole, the first cover also defines a second slide groove corresponding to the pushing rod, and the second slide groove is parallel to the first slide groove, the pushing rod passes through the second slide groove and exposes beyond the first cover, and the pushing rod slides along the second slide groove.

5. The protective cover of claim 4, wherein the latch member comprises a main shaft, a latching disk, and a fastening member, the main shaft is mounted to the internal surface of the first cover, the latching disk is rotatably coupled to the main shaft, and the fastening member is connected with the free end of the main shaft to prevent the latching disk from running off from the main shaft.

6. The protective cover of claim 5, wherein the protective cover further comprises:
    a first threaded portion formed on the movable plate toward the latch member; and
    a second threaded portion formed on the latching disk toward the movable plate, the second threaded portion is engaged with the first threaded portion, and the movable plate drives to rotate the latching disk relative to main shaft by the first threaded portion and the second threaded portion.

7. The protective cover of claim 1, wherein the protective cover further comprises:
    a protrusion defined to one side of the latching disk away from the movable plate; and
    a extending portion formed on the second cover and extended towards the latching disk, the extending portion defines a locking hole corresponding to the protrusion, and the protrusion is latched into the locking hole.

8. The protective cover of claim 7, wherein each unlocking member comprises a password wheel, an adjusting wheel, and a bolt, the password wheel is rotatably mounted to the corresponding assembly hole, and the password wheel comprises a turntable and a connecting shaft, the connecting shaft is connected to the center of the turntable.

9. The protective cover of claim 8, wherein the protective cover further comprises a knob formed on one side of the turntable away from the connecting shaft, and the knob is configured for rotating the turntable.

10. The protective cover of claim 9, wherein the protective cover further comprises a plurality of passwords etched on one side away from the connecting shaft and placed around the knob.

11. The protective cover of claim 10, wherein the connecting shaft comprises a rotating portion and a connecting portion, the rotating portion is connected to one side of the turntable away from the knob, and the rotating portion is rotatably received in the assembly hole, the connecting portion is mounted on the one side of the rotating portion away from the turntable, and the connecting portion is configured to connect with the adjusting wheel.

12. The protective cover of claim 11, wherein the movable plate defines at least one block located on a same side as the receiving hole of the movable plate, at least one opening is defined on the edge of the adjusting wheel, and each block is received in the corresponding opening.

13. The protective cover of claim 12, wherein the connecting portion has a plurality of sides, and each side is positioned to correspond to one of the plurality of passwords.

* * * * *